March 31, 1970　　J. COMEAU, JR., ET AL　　3,503,304
POWER SOURCE

Filed March 18, 1968　　　　　　　　　　　　4 Sheets-Sheet 1

INVENTORS
ROBERT J. HARVEY
JOSEPH COMEAU, JR.
THOMAS C. ROBINSON
BY Kenway, Jenney &
Hildreth
ATTORNEYS March 31, 1970  J. COMEAU, JR., ET AL  3,503,304

POWER SOURCE

Filed March 18, 1968  4 Sheets-Sheet 2

INVENTORS
ROBERT J. HARVEY
JOSEPH COMEAU, JR.
THOMAS C. ROBINSON

By Kenway, Jenney &
Hildreth
ATTORNEYS

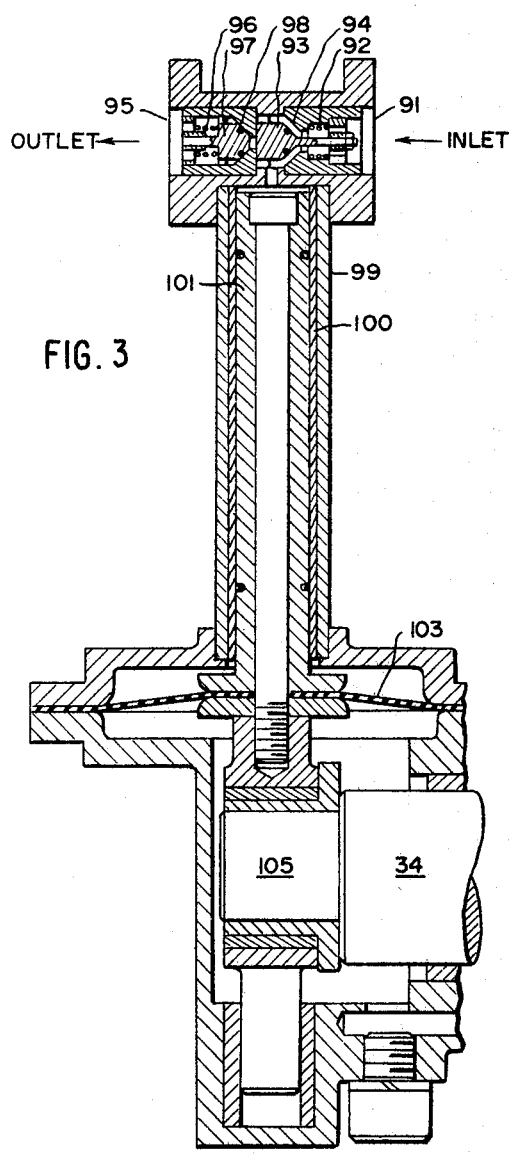
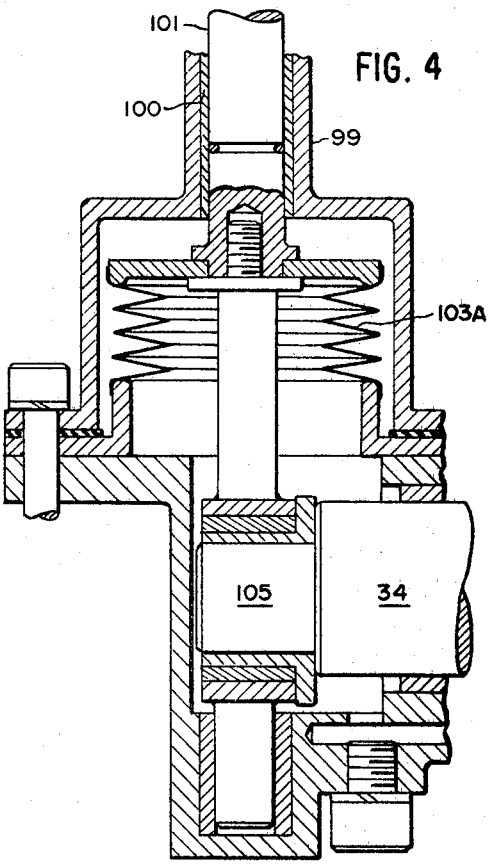

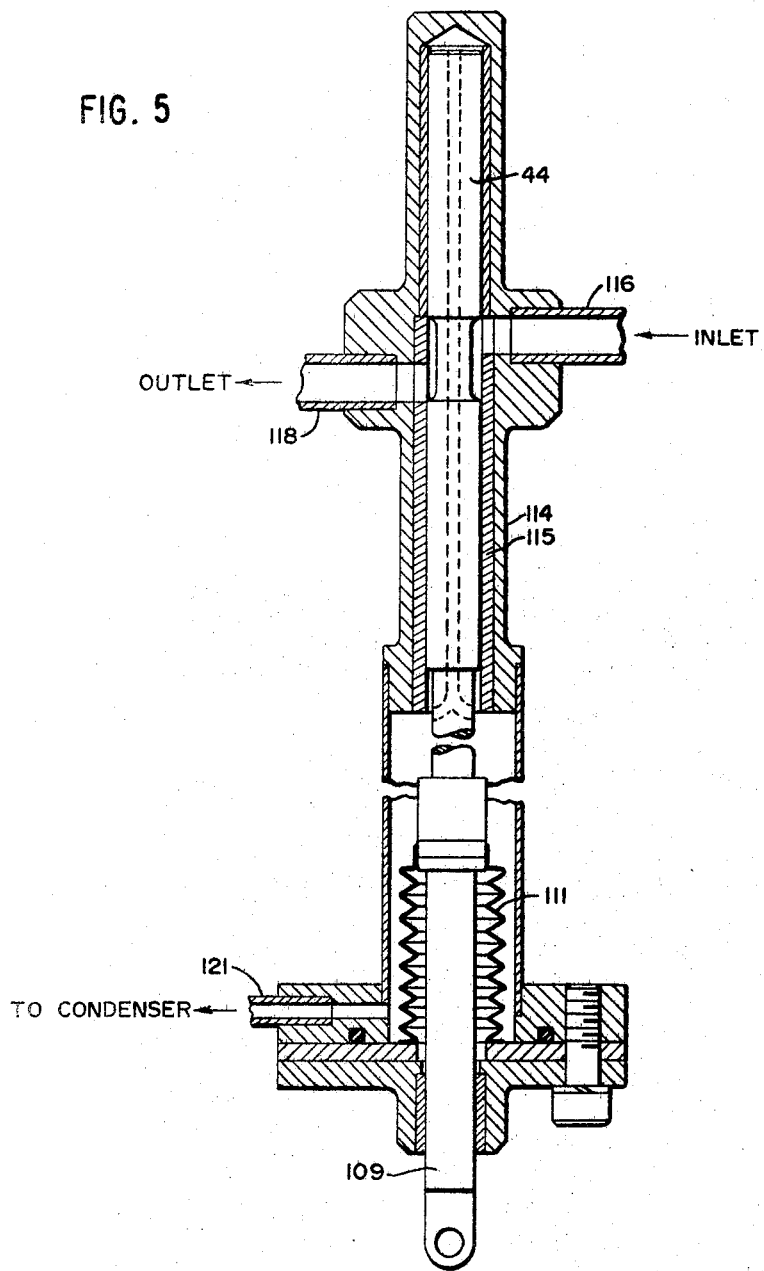

United States Patent Office 3,503,304
Patented Mar. 31, 1970

3,503,304
POWER SOURCE
Joseph Comeau, Jr., Danvers, Robert J. Harvey, Sudbury, and Thomas C. Robinson, West Newton, Mass., assignors to Thermo Electron Corporation, Waltham, Mass., a corporation of Delaware
Filed Mar. 18, 1968, Ser. No. 713,643
Int. Cl. F01b *25/06;* F16j *15/18;* F15b *11/08*
U.S. Cl. 91—336                                    3 Claims

ABSTRACT OF THE DISCLOSURE

A silent, efficient power source organized about a Rankine-cycle vapor engine of the reciprocating type having a thermal side and mechanical or driving side. The vapor or working fluid is hermetically sealed in the thermal side and thus isolated from the mechanical side and from the outside atmosphere. A hermetic seal similarly isolates the working fluid from the mechanical side of the auxiliary engine components such as the feed pump and power control members and the entire thermal system is also hermetically sealed from the outside atmosphere.

---

Figure 1:
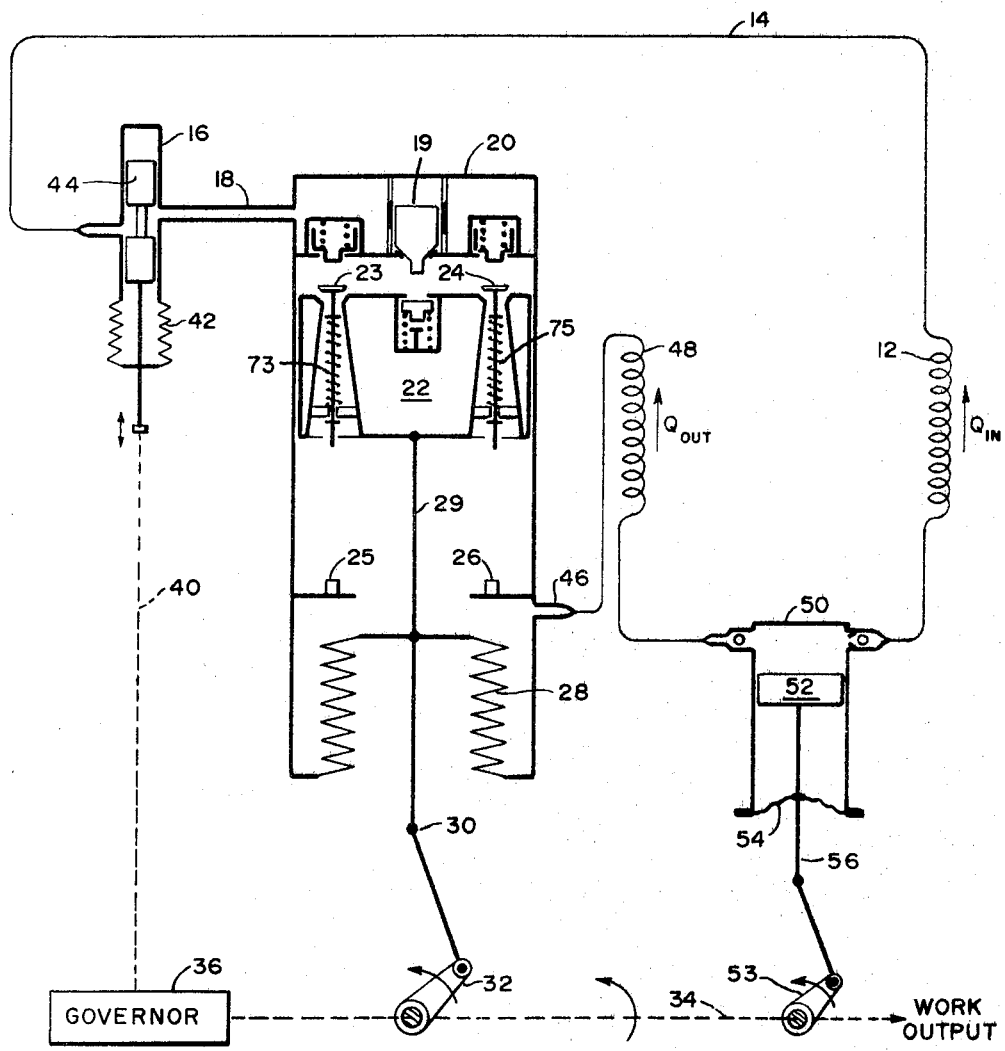

Reciprocating engines using steam or other working fluids are increasingly the subject of research and development. The renewed interest in these engines has come about for several reasons including the availability of new materials and a recognition of the importance of features such as the non-polluting operational characteristics of such engines. Moreover, recent developments have indicated that engine efficiencies comparable to those of gasoline internal combustion engines are attainable.

Still other factors have influenced the rebirth of interest in reciprocating vapor engines. Among these factors are the feasibility of utilizing atomic energy in the form of various isotopes to provide heat needed for the engines, the near-silent operation of the engines, and miniaturization previously deemed impossible. Applications of such engines ranging from the power source of an artificial heart to the motive power for automobiles or even industrial trucks are now under consideration. Between these extremes, lie a myriad of applications, one of which is of great present interest, namely, the prime mover for a light-weight portable electric power source.

Irrespective of the application to which the reciprocating vapor engine is put, there have been fundamental problems. Often, the size and weight of the condenser which is a necessary component of such engines and the power needed to cool that condenser have been excessive. Another frequently-voiced objection to reciprocating vapor engines is the tendency of lubricants in the driving side of the engine to contaminate the working vapor or fluid in the thermal side of the engine and cause premature failure of the entire system. Another persistent problem in the use of reciprocating vapor engines has been the need to remove air and non-condensable gases from the condensers in order that the condensers may operate efficiently. The approach to this problem has generally been to provide apparatus such as air ejection systems, vacuum pumps or the like. Besides adding complexity to the engines, these expedients have also reduced the efficiency of the engines by taking power which would otherwise be available as useful engine output. Finally, since the earliest days of steam engines and as evidenced during the days of the steam-powered automobile, make-up of working fluid has been a vexing difficulty. Obviously, in the absence of an available supply of working fluid, operation of the engine must cease when the original supply is exhausted.

The general object of the present invention is to overcome the problems described above. A specific object of the present invention is a silent, portable, light-weight, maintenance-free Rankine cycle reciprocating vapor engine having a long operating life.

Figure 2:
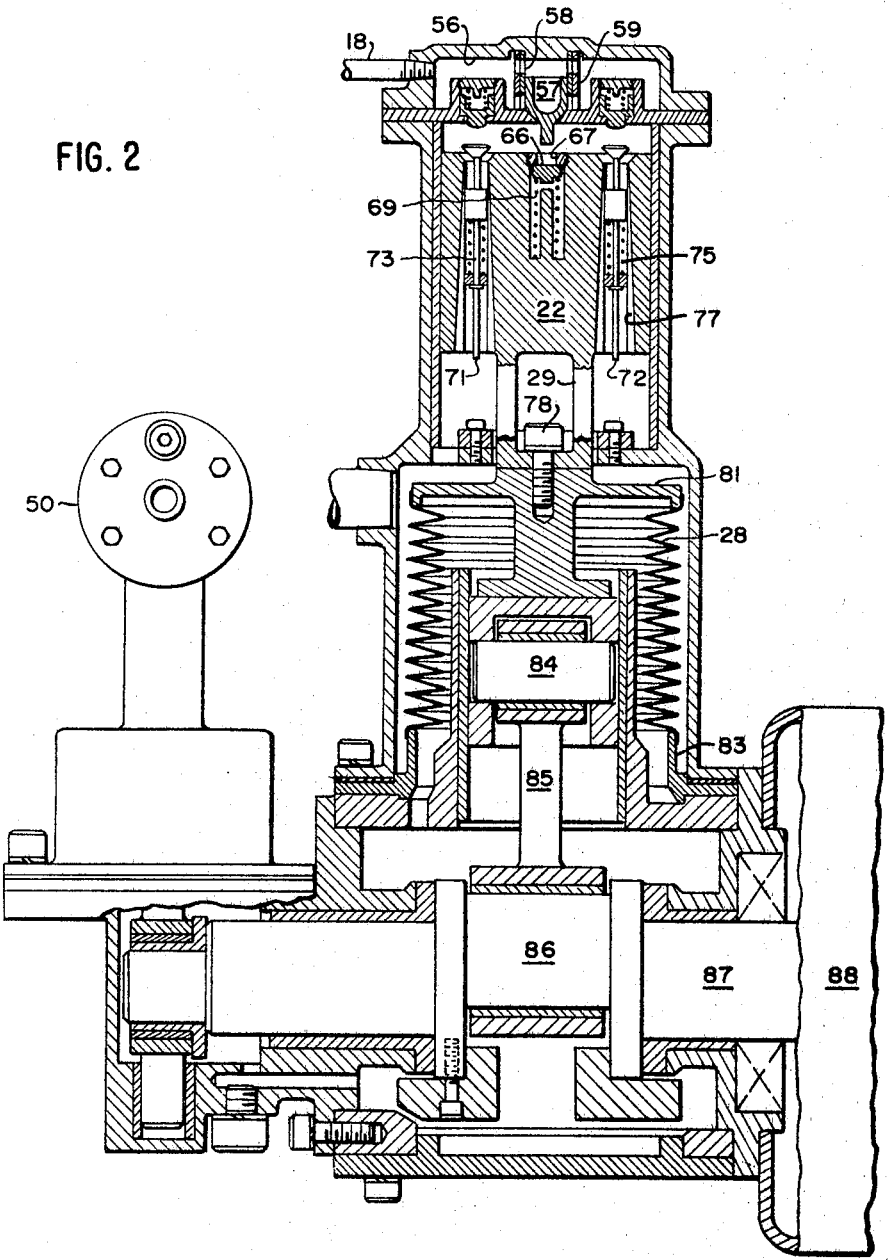

A basic feature of the present invention by which the objects of the invention are achieved is the hermetic sealing of the vapor side of the engine from the driving side. Stated otherwise, a continuous material boundary is employed to positively isolate the thermal components of the engine from the driving components and from the external atmosphere while permitting the transmission of mechanical motion for auxiliary functions as well as useful power output. With such structure, no vapor from the thermal side of the engine can reach the driving side to react with or otherwise affect the lubricants and no lubricant can get from the driving side of the engine to the thermal side to contaminate the working fluid or vapor. Another feature of the invention which is directly related to the hermetic sealing is the capability of first evacuating the thermal side of the engine of all air and non-condensable gases prior to charging that side with a working fluid. The evacuation of the air prior to charging permits the use of a small light-weight condenser and the minimization of back pressure without the use of air ejection systems, vacuum pumps or similar apparatus. Also, because of the hermetic sealing, there is no loss of working fluid to the outside atmosphere which permits the use of a small and permanent charge of working fluid. Make-up of the working fluid being thus eliminated, corrosion and other chemically related problems are minimized, it being possible to utilize a working fluid of the highest chemical purity for the initial and permanent charge. For a better understanding of the present invention, together with other and further objects, features, and advantages, reference should be made to the following description of a preferred embodiment of the invention which should be read with reference to the annexed drawing in which:

FIG. 1 is a schematic diagram of a power source embodying principles of the present invention, FIG. 2 is an illustration, partially in section, of a cylinder and crankcase portion of a vapor engine in which there is a continuous material boundary separating the thermal side of the engine from the driving side of the engine, FIG. 3 is a view, partially in section, of a feed pump for the vapor engine in which separation between the thermal and driving sides is preserved, FIG. 4 is a view similar to that of FIG. 3 showing an alternative structure for the feed pump, and FIG. 5 is a view, partially in section, of a throttle valve for the vapor engine wherein the same thermal barrier is preserved.

In the schematic of FIG. 1 there may be seen a boiler 12 to which heat is applied as indicated by the symbol "Q in" and the arrow. The boiler may be of conventional design, but is preferably a high-efficiency, single-pass unit heated by a burner capable of burning any of a variety of fuels including low-grade fuels. The working fluid may be water which is convertible into steam by the application of heat or it may be mercury, an organic fluid or other natural or synthetic fluid capable of conversion from a liquid to a vapor state.

Upon conversion to vapor, the working fluid is fed through a suitable pipe or conduit 14 to a throttle valve 16 and thence to an inlet port 18 and through an inlet valve 19 to a cylinder 20 of a vapor engine. The inlet valve 19 is described in greater detail hereinbelow, but basically, it operates to permit the vapor to act against the upper surface of a piston 22 when that piston is about at top dead center. A pair of exhaust valves 23 and 24 are in a closed position as the vapor enters through the inlet valve 19 and the piston is driven in a downward direction.

During the downstroke, the force of the vapor from the boiler is sufficient to maintain the exhaust valves 23 and 24 in a closed position. As the piston nears the end of its downward excursion, the stems of the exhaust valves 23 and 24 strike stops 25 and 26 which cause the exhaust valves to open. Also, as explained in greater detail below, the exhaust valves are held by spring-bias in an open position as the piston begins its upward excursion.

The bottom of the cylinder 20 is shown schematically as being closed by an expansible diaphragm 28 to or through the center of which a piston rod 29 is sealed. The piston rod 29 sealed to the center of the diaphragm may extend beyond that point to the pivot 30 of a crankarm 32 by which the reciprocating action of the piston is converted to rotary motion of the crankshaft 34.

The crankshaft 34 is connected to a governor 36 and to a crankarm 32 in addition to providing output rotary motion as indicated by the legend "work output." The governor 36 is connected, in turn, to a reciprocating shaft 40 which is connected through the base of a bellows 42 to a spool-shaped throttling element 44.

Beneath the piston 22, but within the hermetically sealed volume defined by the bellows 28, is a vapor outlet 46 from which exhaust vapor is conducted to a condenser 48 where it is liquefied as indicated by the symbol "Q out." From the condenser 48, the working fluid, in a liquid form, is conducted to a feed pump 50 in which a reciprocating member 52 operates to pump the liquid fluid to the boiler 12. The feed pump 50 is also provided with a diaphragm or bellows 54 through which the piston rod 56 is sealed to operate the piston 52 as a crankarm 53 is rotated by the crankshaft 34.

The engine which is shown schematically in FIG. 1 is illustrated in greater detail in FIG. 2. Although the engine in the present invention may include the particular valving and control elements shown in the schematic diagram of FIG. 1, alternative structures may also be utilized. In the apparatus of that co-pending application, no throttle valve is needed and power control is achieved in a different manner through the agency of the intake valve.

As shown in FIG. 2, the inlet port 18 communicates with an inlet chamber 56 into which vapor at high pressure is admitted. The inlet valve includes a caged reciprocating member 57 which may be contained within a graphite lining sleeve 58 which is surrounded by a steel cylinder 59. Radial openings may be formed through the graphite and steel sleeves about the entire periphery of those members. The valve member 57 is shown in a seated position, its conical portion acting to close the opening between the interior of the valve cage and the interior of the engine cylinder. The cylinder itself is preferably provided with a lining sleeve 65 of graphite. The piston 22 carries an inlet valve actuator 66 which is normally urged to an upward position against a shoulder 67 by the force of a spring 69 which is centrally seated in the piston 22. Above the shoulder 67 is an opening of sufficient diameter to clear the extension of the valve member 57. Also, as indicated in FIG. 1, the exhaust valves 23 and 24 are carried by the piston 22. These valves include stems 71 and 72 which extend entirely through the piston. Springs 73 and 75 urge the valve stem upwardly to maintain the valves 23 and 24 in a normally open position. Slots such as the slot 77 may be formed in the piston about the two valve stems to permit exhaust vapor to clear the various elements surrounding the stems. Alternatively, bypass conduits may be formed through the piston from points just below the valve seats to the lower surface of the piston.

The piston rod 29 is actually a tubular member terminating in a flat disc through which a screw 78 passes to be engaged in a piston rod extension. The piston rod extension includes an enlarged upper closure plate 81 to which the bellows 28 is brazed or otherwise integrally sealed. The lower end of the bellows 28 is similarly sealed to a crankcase housing member 83. Within the bellows 28, the extension of the piston rod 29 is connected to a wrist pin 84 on which a crank rod 85 oscillates to drive a crankpin 86 of a crankshaft 87 in a conventional manner. As an illustration of the work done by the engine, an alternator 88 is shown as being driven by the crankshaft 87. From the opposite end of the crankshaft 87 the feed pump 50 is driven. The mechanical elements involved in the power output and in driving the feed pump are conventional in nature and it is to be understood that a plurality of cylinders arranged to drive a crankshaft of suitable length and design is contemplated; the showing of the engine as incorporating only a single cylinder is for purposes of simplification only.

The feed pump 50, although largely conventional in nature, is so designed that the hermetical barrier between the thermal or vapor side of the engine and the crankcase or mechanical side of the engine is preserved. One embodiment of the feed pump is shown in FIG. 3 and it includes an inlet 91 for fluid from the condenser 48. The inlet 91 is normally closed by the action of a spring 92 which biases the valve member 93 against the seat 94 to its right. An outlet 95 which is connected to the boiler 12 is also normally maintained shut by the biasing action of a spring 96. The action of the spring 96 is to maintain a valve member 97 against its seat 98. Beneath and at right angles to the valve of the feed pump is a cylinder 99 which may be provided with an internal graphite sleeve 100. Within the graphite sleeve 100, a reciprocating plunger 101 is disposed. The stem of the plunger 101 is sealed through a flexible diaphragm 103 and is suitably connected to a cam 105 to provide reciprocating motion to the piston 101 with rotation of the crankshaft 34.

The action of the feed pump is typical of such devices in that the downstroke of the piston 101 creates a vacuum sufficient to overcome the bias of the spring 92, thereby opening the inlet valve to permit the entry of fluid. On the upstroke, the pressure of the piston 101 of the fluid overcomes the bias of the outlet spring 96 and forces the valve member 97 from its seat 98. At the same time, the valve member 93 is forced against its seat 94 shutting off further inflow of fluid.

An alternative embodiment of the feed pump is shown fragmentarily in FIG. 4 wherein the diaphragm 103 of FIG. 3 is replaced by a bellows 103a. With such structure, it is possible to modify and simplify, to some extent, the connection of the valve stem 101 to the cam driven by the crankshaft 34.

In either case, the diaphragm 103 or the bellows 103a isolates the thermal or vapor side of the mechanism from the mechanical or driven side. That is to say, the diaphragm 103 or the bellows 103a constitutes a hermetically sealed barrier between the two sides of the apparatus. In both the structure of FIG. 3 and that of FIG. 4, grooves may be formed on the skirt of the piston 101 to reduce leakage of fluid past the plunger into the lower portion of the pump. In the event that any condensation is encountered, a vent line (not shown) communicates with the area above the diaphragm or bellows and conducts fluid back to the condenser 48.

In the schematic diagram of FIG. 1, a governor 36 is shown connected to the drive shaft 34. This device may be a conventional governor such as a centrifugal adjustable torque mechanism having an arm whose position is determined by the speed of the crankshaft. The movement of the arm is transmitted to the shaft 40 of the throttle valve 16 by a link 109 as seen in FIG. 5. The link 109 is sealed to or through the upper closure member of a bellows 111. The elongated spool member 44 is end-sealed to the upper surface of the top closure of the bellows 111. A housing 114 surrounds the bellows and the spool 44. The housing 114 may contain a graphite liner 115 within which the spool member 44 is longitudinally movable. Extending at right angles to the housing 114 is an inlet 116 which communicates with the vapor line 14 from the boiler 12. At a point diametrically opposite the inlet port 116 is an outlet port 118. The outlet port 118 is displaced longitudinally from the inlet port 116 by a distance sufficient to permit the portion of reduced diameter of the spool 44 to control the flow of vapor from the inlet to the outlet in accordance with its longitudinal position within the cylindrical housing 114. That position is, of course, determined by the governor 36 the arm of which assumes a position determined by the rotational speed of the crankshaft 34. A vent line 121 returned to the condenser 48 serves to conduct condensed vapor which may reach the lower portion of the feed pump back into the closed thermal side of the system.

Although what has been disclosed constitutes preferred embodiments of the present invention, the disclosure should not be taken as a limitation of the present invention but only as illustrative of forms the invention may take.

What is claimed is:

1. In a power source comprising a vapor engine, a feed pump, and a speed controlling throttle valve, each having a mechanical side and a thermal side, the mechanical side including a crankshaft rotatable in a crankcase, and each having a cylinder with a piston reciprocal therein, a system for isolating said thermal sides from said mechanical sides comprising a first expansible member hermetically sealing said engine cylinder to define said thermal side therein in which said engine piston reciprocates and said mechanical side adjacent and including said crankcase and crankshaft, means connecting said engine piston to said crankshaft through said first expansible member, said first member flexing with reciprocation of said engine piston, a second expansible member hermetically sealing said pump cylinder to define said thermal side therein in which said pump piston reciprocates and said mechanical side adjacent and including said crankcase and crankshaft, means connecting said pump piston to said crankshaft through said second expansible member, said second member flexing with reciprocation of said pump piston, a governor connected and responsive to rotation of said crankshaft, a third expansible member hermetically sealing said valve cylinder to define said thermal side therein in which said valve piston reciprocates and said mechanical side adjacent and including said governor, means connecting said governor to said valve piston through said third expansible member, said third member flexing with reciprocation of said valve piston, whereby the thermal sides of said engine, said feed pump and said throttle valve are hermetically sealed from the mechanical sides thereof.

2. In a power source as defined in claim 1, the combination which includes an inlet valve connected between said throttle valve and said engine cylinder and means within said engine cylinder for acuating said inlet valve.

3. In a power source as defined in claim 1, the combination of at least one outlet valve disposed in said engine piston and means within said engine cylinder for actuating said outlet valve.

References Cited

UNITED STATES PATENTS

| 1,495,290 | 5/1924  | Epperson  | 74—18.2  |
| 1,593,838 | 7/1926  | Michelsen | 74—18.2  |
| 1,731,130 | 10/1929 | Fulton    | 74—18.2X |
| 2,142,190 | 1/1939  | Hewitt    | 92—168X  |
| 2,322,043 | 6/1943  | McCune    | 92—168X  |
| 2,671,632 | 3/1954  | Palmer    | 74—18.2X |
| 2,949,013 | 8/1960  | Doble     | 60—105X  |
| 3,068,653 | 12/1962 | Driscoll  | 60—95X   |
| 3,409,782 | 11/1968 | Bronick   | 60—105X  |

CARROLL B. DORITY, Jr., Primary Examiner

U.S. Cl. X.R.

60—96; 74—18.2; 91—422; 92—165, 168